Sept. 17, 1929.　　　F. T. HAGUE　　　1,728,564

VENTILATING SYSTEM

Filed Sept. 13, 1926

INVENTOR
Floyd T. Hague.
BY
ATTORNEY

Patented Sept. 17, 1929

1,728,564

UNITED STATES PATENT OFFICE

FLOYD T. HAGUE, OF WILKINSBURG, PENNSYLVANIA, ASSIGNOR TO WESTINGHOUSE ELECTRIC & MANUFACTURING COMPANY, A CORPORATION OF PENNSYLVANIA

VENTILATING SYSTEM

Application filed September 13, 1926. Serial No. 135,037.

My invention relates to ventilating systems and it has particular relation to the ventilation of rotary converters which may, or may not, be provided with boosters.

Figure 1:
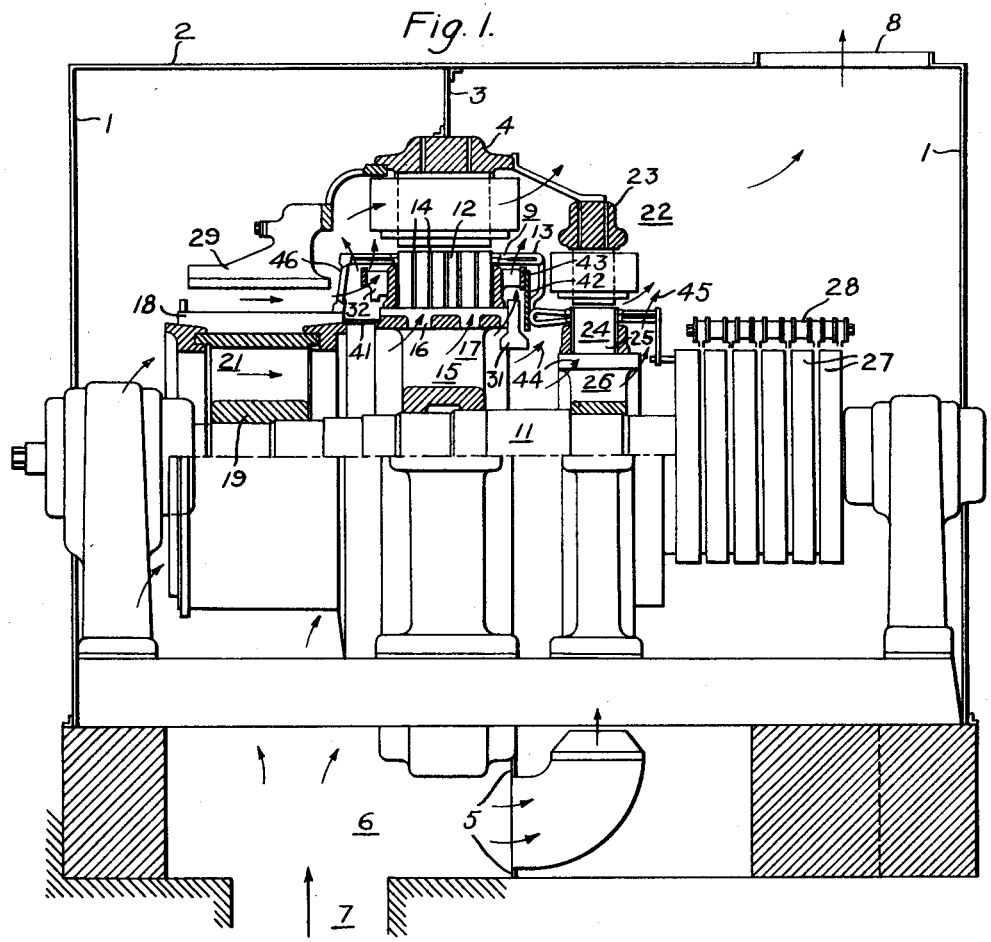
Figure 2:
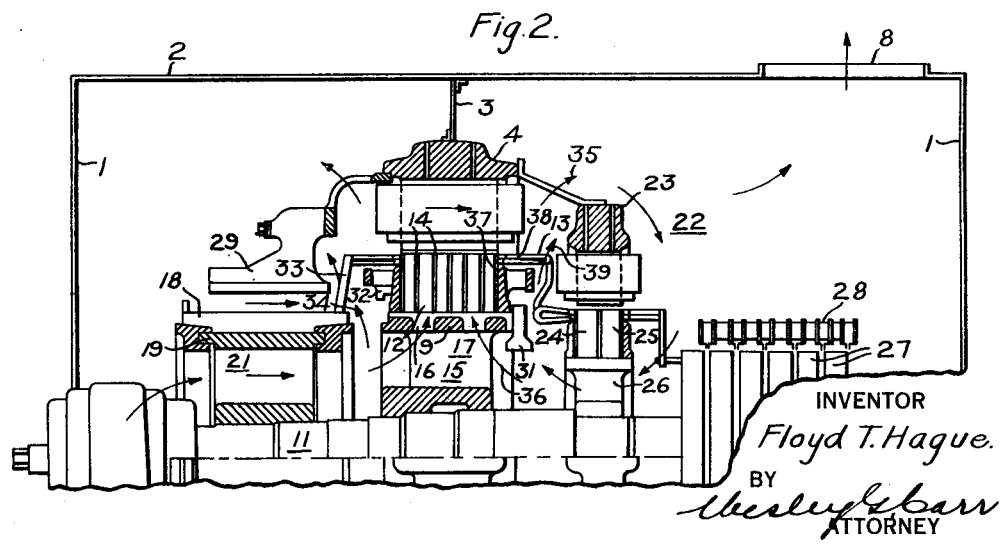

My invention relates to certain details and combinations relating to the ventilation of rotary converters which will best be understood by reference to the accompanying drawing, wherein Fig. 1 is a view, partly in longitudinal section and partly in elevation, showing a rotary converter installation in accordance with my invention, and Fig. 2 is a longitudinal sectional elevation of a rotary converter installation representing the most advanced progress of the art prior to my invention.

The application of rotary converting apparatus to most large Edison systems requires totally inclosed, forced-ventilated converters and motor-generator sets in order to secure adequate ventilation, to maintain a low ambient room temperature and to deaden the noise sufficiently to insure satisfactory operation under present and future operating conditions.

In the ventilation of synchronous converters, it is very undesirable to allow the metal dust from the alternating-current brushes to pass through the machine windings and, for this reason, it is most desirable to introduce the cooling air into the machine from the front end under the commutator; but this usually involves forcing the cooling air in opposition to the natural ventilating tendencies of the machine, and, for that reason, it has required considerable development work and experimentation with machines in actual operation.

In Figs. 1 and 2 is shown an enclosure system for a booster rotary converter wherein the entire machine is enclosed in a small room or enclosure comprising side and top walls 1 and 2, a central partition 3 between the top wall and the top of the stator frame 4 of the rotary converter and a corresponding bottom partition 5 in the pit 6 underneath the converter. The air inlet is through an opening 7 in the pit on the commutator side of the partitions, and the air outlet is through an opening 8 in the top of the enclosure on the slip-ring side of partitions.

The rotary converter comprises the stator member 4 and a rotor member 9, the latter comprising a shaft 11, an armature core 12 having armature windings 13 and radial ventilating passages 14, an armature spider 15 having radial and longitudinal ventilating passages 16 and 17, a commutator member 18 and a commutator spider 19, the latter having longitudinal ventilating openings 21 and being mounted upon the shaft 11 adjacent to the front end of the armature core 12 and spider 15.

In the apparatus illustrated in the drawing, the converter is provided with a booster 22 comprising a stator member 23 and a rotor member 24, the latter comprising an armature core 25 and an armature spider 26 disposed on the shaft 11 adjacent to the rear end of the rotary-converter-armature core 12 and spider 15. A plurality of slip-rings 27 are disposed at the rear end of the booster-armature core and spider.

Alternating current is led into the converter by means of metallic brushes mounted on brushholders 28 in operative relation to the slip-rings 27. The direct current is led away from the commutator member 18 by means of carbon brushes mounted in suitably disposed brushholders 29, as will be well understood by those skilled in the art.

Means are provided for drawing air through the converter, and this means may comprise, in addition to the natural or forced draft obtaining in the air inlet 7 and the discharge flue 8, a blower comprising a plurality of plates 31 mounted on the rear end of the rotary-converter-armature spider 15, for drawing air through the longitudinal ventilating passages 21 and 17 of the commutator and armature spiders of the rotary converter, and a second blower comprising plates 32 mounted on the front end of the armature core of the rotary converter for ventilating the front end of the armature winding 13. Natural ventilation is usually largely relied upon for ventilating the booster 22.

It will now be apparent that, in an enclosure system supplying air from the commutator end, it is necessary for practically all of the cooling air to enter the machine through the commutator spider. It has been found from experience that only a limited amount of air can be supplied through the commutator spider, owing to the small area which is usually available between the spider arms of the commutator.

Referring to Fig. 2 of the drawing, I have indicated the arrangement of parts and the air flow in a booster rotary converter constructed in accordance with the past practice, prior to my invention. The commutator necks 33 and the front end turns of the armature windings 13 constitute a powerful blower, which cooperates with the front end blower 32 in drawing air from the interior of the armature, as indicated by the arrow 34. The air which is so drawn from the interior of the armature, however, is a part of the limited quantity of air which has already passed through the restricted commutator spider openings, and it seriously reduces the quantity of air available for circulation in the longitudinal and radial ventilating passages of the armature spider and core of the rotary converter.

The flow of the cooling air in prior ventilating systems is fully indicated by arrows in Fig. 2. By reason of the combined blower actions of the rotors 9 and 24 of the converter and booster, it usually happens that the air is discharged vertically between the stator members of the two machines, as indicated by the arrow 35. As a result of the diminution of the air entering the commutator spider by reason of the leakage path 34 between the commutator and the front end of the rotary converter armature, it frequently happens also that some of the air which has entered the booster armature spider from under the metallic slip-ring brushes enters the rear end of the rotary converter armature spider and so passes into the ventilating ducts of the rotary converter armature core, as indicated by the arrow 36. It will thus be seen that, in addition to making an inefficient use of the air passing through the restricted ventilating passages in the commutator spider, the rotary converters of the prior art also involved the contamination of the rotary-converter armature with metallic dust particles carried from the slip-rings.

Reference to Fig. 2 will also show that machines as heretofore constructed, resulted in a discharge of air from the space between the converter and the booster, in a direction toward the booster and away from the end plate 37 of the rotary-converter armature core, and away from the end turns 38 of the rotary-converter armature windings 13, as indicated by the arrow 39, thus resulting in an insufficient cooling of the rotary-converter parts just mentioned.

According to my present invention, as shown in Fig. 1, the defects of the earlier ventilating systems are effectively overcome. The leakage path between the commutator spider and the front end of the armature spider of the rotary converter is closed by means of a cylindrical baffle 41, and by "cylindrical" I mean either cylindrical, frusto-conical, or the like, as will be readily understood.

The air which is discharged from the rear-end blower 31 is prevented from blowing away from the rotary converter toward the booster by means of a substantially radially extending baffle 42, whereby the major portion of the air which is discharged from the rear end of the longitudinal ventilating passage in the armature spider of the rotary converter is caused to pass up close to the rear end of the rotary-converter armature core, thus effectually ventilating the same.

The radial baffle 42 may conveniently be secured to the end-turn armature-coil supports 43, and it may extend downwardly to a point slightly above the rear corner of the blower plates 31, so that the blower is disposed mainly in front of the baffle member. In rotary converters which are not provided with boosters, it will be understood that the radial baffle 42 may be extended down to the shaft of the machine in order to prevent any flow of air underneath the baffle, as such flow would obviously be wasted if there were no booster beyond the same, to be cooled thereby.

It will be noted that the paths taken by the ventilating air in a booster rotary converter are dependent upon the relative fanning actions of the rotor members of the booster and the converter, respectively. By closing the front-end leakage path by means of my cylindrical baffle 41 and by providing a radial baffle 42 behind the rear-end blower 31, I have so conserved the air passing through the commutator spider of my machine that there is a blast of air which escapes below the radial baffle 42 and is discharged rearwardly toward the booster member 22, as indicated by the arrows 44.

I have thus reversed the natural ventilating air flow of the booster by causing the booster ventilating air to be discharged from the rear end of the booster armature spider, as indicated by the arrow 45, instead of being discharged from the front end of the booster armature spider, as was the case in the construction shown in Fig. 2. Thus, the ventilating air is blown from the booster to the space around the slip-ring brushes, in my invention, instead of being drawn over the slip-rings, and thence into the vital parts of the machine, as was the case in prior constructions.

On machines having short commutator necks, the cooling of the front-end turns of the rotary-converter-armature winding 13 is accomplished by the utilization of twisted or skewed commutator necks 46, as indicated in Fig. 1, which constitute inclined blowers tending to cause the air to pass into the machine, toward the front end of the armature core 12, rather than out of the machine, as has sometimes happened by reason of the powerful blower action of the usual commutator necks, causing a suction of air away from the front end of the armature core.

While I have described my invention in considerable detail in a preferred embodiment, it will be obvious that many changes and modifications may be made without sacrificing the essential features thereof. I desire, therefore, that the appended claims shall be accorded the broadest construction consistent with same and the prior art.

I claim as my invention:

1. A rotary converter of the unenclosed type comprising a stator member and a rotor member comprising a shaft, an armature core having armature windings and radial ventilating pasages, an armature spider having radial and longitudinal ventilating passages, a commutator member and commutator spider disposed on said shaft adjacent to the front end of said armature core and spider, said commutator spider having longitudinal ventilating passages, a plurality of slip rings disposed at the rear of the armature core and spider, means for drawing a ventilating fluid from the commutator end through said longitudinal ventilating passages in said spiders, means for insuring that all of the fluid for ventilating all of the passages enters at the outer end of said commutator spider, characterized by a cylindrical baffle between the peripheries of the commutator and armature spiders.

2. A rotary converter of the unenclosed type comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, a plurality of slip rings disposed at the rear of the armature core and spider and means for drawing a ventilating fluid from the commutator end through said longitudinal ventilating passages in said spiders, means for insuring that all of the fluid for ventilating all of said passages enters at the outer end of said commutator spider, characterized by a cylindrical baffle between the peripheries of the commutator and armature spiders, and separate means constituting twisted or skewed commutator necks for blowing a parallel flow of ventilating fluid against the front end of the armature core and windings, through said converter and external of said armature.

3. A rotary converter of the unenclosed type comprising a stator member and a rotor member comprising a shaft, an armature core having armature windings and radial ventilating passages, and armature spider having radial and longitudinal ventilating passages, a commutator member and commutator spider disposed on said shaft adjacent to the front end of said armature core and spider, said commutator spider having longitudinal ventilating passages, a plurality of slip rings disposed at the rear of the armature core and spider, means for drawing a ventilating fluid from the commutator end through said longitudinal ventilating passages in said spiders, means for insuring that substantially no ventilating fluid from said slip rings is led into said armature spider, characterized by a substantially radially extending baffle adjacent to the rear end of the armature core and spider, said ventilating means comprising fan blades adjacent to, and substantially in front of, said radial baffle.

4. A rotary converter of the unenclosed type comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, a plurality of slip rings disposed at the rear of the armature core and spider, means for drawing a ventilating fluid from the commutator end through the said longitudinal ventilating passages in said spiders, means for insuring that all of the fluid for ventilating all of said passages enters at the outer end of said commutator spider, characterized by a cylindrical baffle between the peripheries of the commutator and armature spiders, and a substantially radially extending baffle for preventing fluid from entering said passages by way of said slip rings, adjacent to the rear end of the armature core and spider, said ventilating means comprising fan blades adjacent to, and substantially in front of, said radial baffle.

5. A rotary converter comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, a plurality of slip rings disposed at the rear of the armature core and spider, means for drawing a ventilating fluid from the commutator end through said longitudinal ventilating passages in said spiders, and means for insuring that substantially no ventilating fluid from said slip rings is led into said armature spider.

6. The combination of a rotary converter of the unenclosed type comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, and a booster converter of the unenclosed type comprising a stator member and a rotor member, the latter comprising an armature core and an armature spider disposed on said shaft adjacent to the rear end of said rotary-converter armature core and spider, a plurality of slip rings disposed at the rear of said booster armature core and spider, and means for causing a ventilating fluid to pass from the commutator end through said longitudinal ventilating passages in said rotary-converter commutator and armature spiders and through said booster toward said slip rings.

7. The combination of a rotary converter comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, and a booster of the unenclosed type comprising a stator member and a rotor member, the latter comprising an armature core and an armature spider disposed on said shaft adjacent to the rear end of said rotary-converter armature core and spider, a plurality of slip rings disposed at the rear of said booster armature core and spider, and means for causing a ventilating fluid to pass from the commutator end through said longitudinal ventilating passages in said rotary converter commutator and armature spiders and through said booster toward said slip rings, means for insuring that all of the ventilating fluid enters the passages at the outer end of commutator spider, characterized by a cylindrical baffle between the peripheries of the commutator and armature spiders of said rotary converter, and means for causing a parallel flow of ventilating fluid constituting twisted or skewed commutator necks for blowing a blast of ventilating fluid against the front end of the armature core and windings of said rotary converter, through said converter and external of said rotary armature.

8. The combination of a rotary converter of the unenclosed type comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, and a booster of the unenclosed type comprising a stator member and a rotor member, the latter comprising an armature core and an armature spider disposed on said rotary-converter armature core and spider, a plurality of slip rings disposed at the rear of said booster armature core and spider, and means for causing a flow of ventilating fluid from the commutator end through said longitudinal ventilating passages in said rotary-converter commutator and armature spiders and preventing flow of fluid through said passages from said slip rings, characterized by a substantially radially extending baffle between the rotary converter and the booster, said ventilating means comprising fan blades adjacent to, and mainly in front of, said radial baffle.

9. A rotary converter comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, a booster comprising a stator member and a rotor member, the latter comprising an armature core and an armature spider disposed on said shaft adjacent to the rear end of said rotary-converter armature core and spider, a plurality of slip rings disposed at the rear of said booster armature core and spider, and means for drawing a ventilating fluid from the commutator end through said longitudinal ventilating passages in said rotary converter commutator and armature spiders, characterized by a cylindrical baffle between the peripheries of the commutator and armature spiders of said rotary converter, and a substantially radially extending baffle between the rotary converter and the booster, said ventilating means comprising fan blades adjacent to, and mainly in front of, said radial baffle.

10. The combination of a rotary converter comprising a stator member and a rotor member comprising a shaft, an armature core having armature windings and radial ventilating passages, an armature spider having radial and longitudinal ventilating passages, a commutator member and commutator spider disposed on said shaft adjacent to the front end of said armature core and spider, said commutator spider having longitudinal ventilating passages, and a booster comprising a stator member and a rotor member, the latter comprising an armature core and an armature spider disposed on said shaft adjacent to the rear end of said booster armature core and spider, means for drawing a ventilating fluid from the commutator end through said longitudinal ventilating passages in said rotary-converter commutator and armature spiders, and means for insuring that substantially no ventilating fluid from said slip rings is led into said rotary-converter armature spider.

11. A rotary converter comprising a stator member and a rotor member comprising a shaft, an armature core having armature windings and radial ventilating passages, an armature spider having radial and longitudinal ventilating passages, a commutator member and a commutator spider disposed on said shaft adjacent to the front end of said armature core and spider, said commutator spider having longitudinal ventilating passages, a booster comprising a stator member and a rotor member, the latter comprising an armature core and an armature spider disposed on said shaft adjacent to the rear end of said rotary converter armature core and spider, a plurality of slip rings disposed at the rear of said booster armature core and spider, means for drawing a ventilating fluid from the commutator end through said logitudinal ventilating passages in said rotary converter commutator and armature spiders, and means for insuring that substantially all of the ventilating fluid in both the rotary converter and the booster flows in a rearward direction away from the commutator end and toward the slip ring end.

12. In a ventilating system for large dynamo-electric machines, the combination of an enclosure having two compartments and ventilating openings therein, of a rotary converter of the unenclosed type within said enclosure, and so arranged as to have its commutator end in one of said compartments and its slip-ring end in the other, of means for forcing air into said commutator compartment, and means associated with said converter for insuring flow of ventilating fluid through said converter from the commutator end toward slip-ring end of said converter.

13. In a ventilating system for large dynamo-electric machines, the combination of an enclosure having two compartments, and ventilating openings therein, of a rotary converter of the unenclosed type within said enclosure, and so arranged as to have its commutator end in one of said compartments and its slip-ring end in the other, of means for forcing air into said commutator compartment, means for admitting ventilating fluid to said slip-ring compartment for separate cooling of the slip rings, and another opening in the wall of said slip-ring compartment for providing exit of all of the fluid entering both compartments of said enclosure.

In testimony whereof, I have hereunto subscribed my name this 3rd day of September, 1926.

FLOYD T. HAGUE.